(No Model.)
J. H. VINTON.
FRICTION DRILL.
No. 378,944. Patented Mar. 6, 1888.
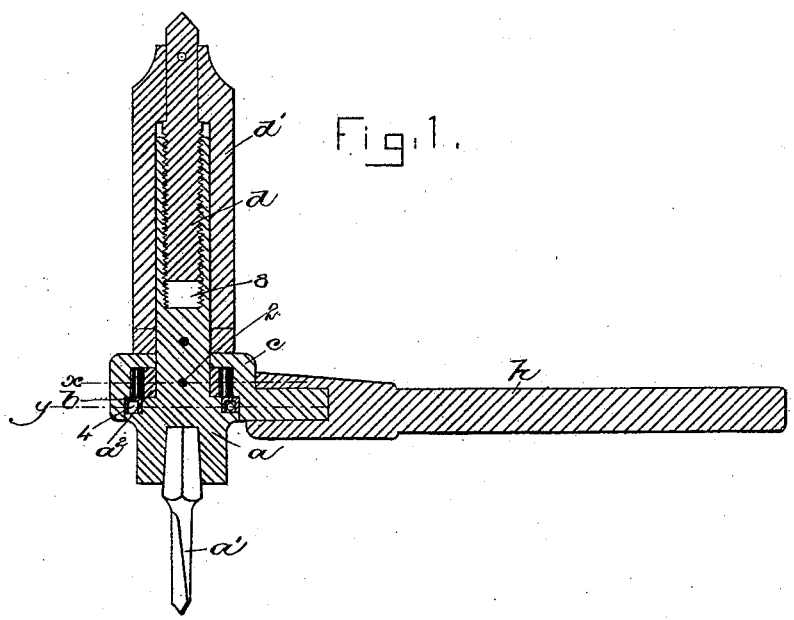
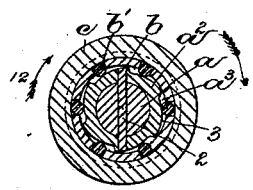
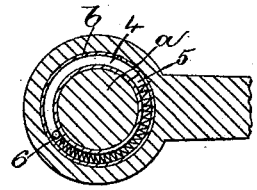
Witnesses.
Howard F. Eaton.
Fred L. Emery.
Inventor.
John H. Vinton
by Kirby & Gregory
attys.

UNITED STATES PATENT OFFICE.

JOHN H. VINTON, OF BOSTON, MASSACHUSETTS, ASSIGNOR OF TWO-THIRDS TO EDWARD O. ELY, OF SAME PLACE, AND GEORGE E. PARKER, OF CHELSEA, MASSACHUSETTS.

FRICTION-DRILL.

SPECIFICATION forming part of Letters Patent No. 378,944, dated March 6, 1888.

Application filed June 28, 1887. Serial No. 242,744. (No model.)

*To all whom it may concern:*

Be it known that I, JOHN H. VINTON, of Boston, county of Suffolk, and State of Massachusetts, have invented an Improvement in Friction Ratchet-Drills, of which the following description, in connection with the accompanying drawings, is a specification, like letters on the drawings representing like parts.

This invention has for its object to improve that class of ratchet-drills adapted to be moved by friction, whereby great power may be applied to rotate the spindle carrying the drill and with the minimum of lost motion to the handle.

In accordance with this invention the spindle carrying the drill has removably attached to it a hardened-steel hub provided with several recesses, each one of which has an inclined side. The recessed hub is surrounded by a spring-controlled loose ring having slots or recesses corresponding in number with those in the hub, the recesses of the loose ring and of the hub receiving a series of rollers, any rotation of the ring in one direction by a spring tending to move the rollers longitudinally in the recesses of the hub and in a direction to travel up the inclined sides thereof. The hub, the loose ring, and its rollers are inclosed in a ring or cap of sufficient diameter to move freely independently of the inclosed parts when the rollers are in the deeper portions of the recesses of the hub, or to engage and move the inclosed parts when the rollers have been moved by the loose ring partially up the inclined sides of the recesses of the hub, the rollers thereby frictionally binding the outer ring or cap and hub together. The spring controlling the movement of the loose ring tends normally to so position the ring with relation to the hub that the rollers bind or wedge frictionally between the hub or cap, to thereby prevent any lost motion of the handle when it is moved to turn the outer or inclosing cap or ring; but the moment that such movement of the handle ceases the spring moves the loose ring, to again bind the rollers into the converging or narrow parts of the recesses between the hub and ring.

The spindle of the drill is bored axially and screw-threaded to receive the screw-threaded feed-bar fixed centrally within a hollow cap or sleeve, which latter fits loosely upon the spindle in the usual manner.

Figure 1 shows in vertical section a friction ratchet-drill embodying this invention; Fig. 2, a horizontal section of a portion of a drill, taken on the dotted line *x x*, Fig. 1; Fig. 3, a horizontal section of a portion of a drill, taken on the dotted line *y y*, Fig. 1.

The spindle *a*, carrying the drill or other tool *a'* in usual manner, has removably attached to it, as by a pin, 2, a hardened-steel hub, $a^2$, the periphery of which is cut away to present several recesses, as $a^3$, each of which has one inclined side or face, 3.

A loose ring, *b*, encircling the hub $a^2$, has several slots cut through it, corresponding in number and position with the recesses in the hub, each of said slots receiving a roller, *b'*, which also enters a recess of the hub.

The cap or ring *c*, inclosing the loose ring containing the rollers, is of sufficient diameter to move independently of the loose ring when the rollers *b'* are in the deeper portions of the recesses of the hub; but when the rollers are moved up the inclined faces of the recesses of the hub they become wedged between the cap or ring *c* and the hub, and in this position of parts any movement of the cap or ring *c* in the direction of the arrow, Fig. 2, moves the hub in unison with it and with substantially no lost motion. The loose ring *b* in this instance is provided upon its under side with an annular groove, (see Figs. 1 and 3,) in which groove is placed a spiral spring, one end of which bears against a pin or block, 5, fixed to the ring within the groove, the other end of the spring bearing against a pin, 6, fixed to the spindle *a*, the function of said spring being to move the loose ring *b* in the direction of the arrow shown in Fig. 2, to thus normally keep the rollers wedged between the cap *c* and the hub $a^2$.

The implement so constructed is always in such condition that whenever the handle *h*, which is fixed to the cap or ring *c*, is moved in the direction shown by the said arrow, Fig. 2, the spindle *a* will be rotated, and any movement of the handle *h* in the opposite direction will cause the rollers to enter the deeper portions of the recesses of the hub sufficiently to permit the cap or ring c to move independently of the other parts, leaving the spindle at rest.

The spindle a is extended upward and bored, as at 8, and screw-threaded to receive the screw-threaded feed-bar d, fixed centrally to a sleeve or cap, d', which latter fits loosely upon the upper part of the spindle a, said sleeve d' and the feed-bar d co-operating with the screw-threaded spindle to serve as a feeding device for the tool carried by the spindle.

By the construction herein shown and described it will be seen that the lost motion of the handle in the direction to turn the spindle is reduced to the minimum, the said lost motion being quite imperceptible, which is not the case in any other so called "ratchet-drill" known to me.

I do not desire to limit my invention to the particular thing to be grasped or engaged by the spindles to be rotated.

I claim—

1. In a friction ratchet-drill, the spindle to be moved intermittingly, its independent hub having recesses provided with an inclined side, combined with a spring-controlled slotted loose ring encircling the hub, rollers placed in the slots of the loose ring and entering the recesses of the hub, and an inclosing ring or cap, c, and handle, substantially as described.

2. In a ratchet-drill, the spindle and hub, the surrounding cap or ring having an attached handle, the cap and hub being separated one from the other to leave a ring-receiving space, and a series of notches with inclined sides cut into one of the side walls of said space, combined with a spring-controlled loose ring provided with a series of rollers adapted to co-operate with the inclined sides of said notches to effect the movement of the spindle when the handle is moved in one direction, but not interfering with the movement of the spindle when the handle is moved in the opposite direction, substantially as described.

In testimony whereof I have signed my name to this specification in the presence of two subscribing witnesses.

JOHN H. VINTON.

Witnesses:
  BERNICE J. NOYES,
  F. L. EMERY.